United States Patent
Hsieh

(10) Patent No.: US 7,573,641 B2
(45) Date of Patent: Aug. 11, 2009

(54) FREE-SPACE OPTICAL HYBRID

(75) Inventor: Yung-Chieh Hsieh, San Jose, CA (US)

(73) Assignee: Optoplex Corporation, Fremont, CA (US)

( * ) Notice: Subject to any disclaimer, the term of this patent is extended or adjusted under 35 U.S.C. 154(b) by 0 days.

(21) Appl. No.: 11/729,004

(22) Filed: Mar. 27, 2007

(65) Prior Publication Data

US 2007/0223932 A1 Sep. 27, 2007

Related U.S. Application Data

(60) Provisional application No. 60/786,630, filed on Mar. 27, 2006, provisional application No. 60/899,579, filed on Feb. 2, 2007.

(51) Int. Cl.
*G02B 27/10* (2006.01)
*G02B 27/12* (2006.01)
*G02B 1/10* (2006.01)
*H04B 1/00* (2006.01)

(52) U.S. Cl. .................. 359/637; 359/640; 359/583; 398/115

(58) Field of Classification Search ............... 359/450, 359/583, 629, 634, 637, 639, 640; 398/115, 398/116, 152, 204, 205
See application file for complete search history.

(56) References Cited

U.S. PATENT DOCUMENTS 6,587,204 B2 * 7/2003 Hsieh .................. 356/450
7,106,508 B2 * 9/2006 Du et al. .................. 359/498
7,110,677 B2 * 9/2006 Reingand et al. ............. 398/98
7,145,727 B2 * 12/2006 Hsieh ..................... 359/634
7,408,713 B1 * 8/2008 Hsieh et al. ................ 359/577
2003/0058499 A1 * 3/2003 Reingand et al. ............ 359/135
2007/0070505 A1 * 3/2007 Hsieh ..................... 359/578

FOREIGN PATENT DOCUMENTS

WO  WO 2007/126846 A2 * 11/2007

OTHER PUBLICATIONS

International Search Report (PCT/ISA/210) prepared for International Application (PCT/US2007/007606), prepared by the United States Patent and Trademark Office on Jan. 14, 2008.*

* cited by examiner

*Primary Examiner*—David N Spector
(74) *Attorney, Agent, or Firm*—John P. Wooldridge; Antonio R. Durando

(57) ABSTRACT

An exemplary optical hybrid includes a 50/50 un-polarized beam splitter, a folding prism, a beam shifter, a spacer and a phase shifter such that from an input S-beam (signal) and an L-beam (reference), four outputs, S+L, S−L, S+jL, S−jL, are produced. The phase difference of S and L at the four output ports is phi_0, phi_0+90-degrees, phi_0+180-degree, phi_0+270-degree, where the phase difference between S and L at the S+L port is an arbitrary number phi_0 and the phase difference between S and L at the other output ports, S−L, S+jL, S−jL, is 90, 180 and 270, respectively, shifted from phi_0.

24 Claims, 6 Drawing Sheets

FREE-SPACE OPTICAL HYBRID

This application claims priority to Provisional Patent Application Ser. No. 60/786,630, titled "Free-Space Optical Hybrid" filed Mar. 27, 2006, incorporated herein by reference. This application claims priority to Provisional Patent Application Ser. No. 60/899,579, titled "Thin Film Coated Optical Hybrid" filed Feb. 2, 2007, incorporated herein by reference.

BACKGROUND OF THE INVENTION

1. Field of the Invention

The present invention relates to coherent detection, and more specifically, it relates to a low cost, compact, and temperature-insensitive optical hybrid.

2. Description of Related Art

Since the late 1990s, the transport capacities of ultra-long haul and long-haul fiber-optic communication systems have been significantly increased by the introduction of the erbium-doped fibre amplifier (EDFA), dense wavelength division multiplexing (DWDM), dispersion compensation, and forward error correction (FEC) technologies. For fiber-optic communication systems utilizing such technologies, the universal on/off-keying (OOK) modulation format in conjunction with direct detection methods have been sufficient to address data rates up to 10 Gb/s per channel.

In order to economically extend the reach and data capacity beyond such legacy systems and into next-generation networks, several technological advancements must take place, including but not limited to, 1) adoption of a differential phase-shift keying (DPSK) modulation format, as opposed to OOK; 2) developments in optical coherent detection; and 3) progress in adaptive electrical equalization technology. In combination, these technologies will boost a signal's robustness and spectral efficiency against noise and transmission impairments.

Such crucial strides in optical signal technology are no longer theoretical possibilities but are feasible solutions in present-day optical networking technology. The path for an optical coherent system has already been paved by 1) the deployment of DPSK modulated systems by Tier-1 network providers; and 2) the increased computational capacity and speed of electronic DSP circuits in receivers, which provides an efficient adaptive electrical equalization solution to the costly and difficult optical phase-lock loop. These advances coupled with a commercially feasible optical hybrid solution would likely give pause to Tier-1 providers and carriers to reassess their earlier rationales for not adopting and implementing an optical coherent detection scheme. Perhaps with such advances, optical networks will begin to realize the benefits already recognized in microwave and RF transmission systems for extending capacity and repeaterless transmission distances through coherent detection.

The commercial feasibility of a coherent system for optical signal transmission was first investigated around 1990 as a means to improve a receiver's sensitivity. In contrast to existing optical direct-detection system technology, an optical coherent detection scheme would detect not only an optical signal's amplitude but phase and polarization as well. With an optical coherent detection system's increased detection capability and spectral efficiency, more data can be transmitted within the same optical bandwidth. More over, because coherent detection allows an optical signal's phase and polarization to be detected and therefore measured and processed, transmission impairments which previously presented challenges to accurate data reception, can, in theory, be mitigated electronically when an optical signal is converted into the electronic domain. However, the technology never gained commercial traction because the implementation and benefits of an optical coherent system could not be realized by existing systems and technologies.

Implementing a coherent detection system in optical networks requires 1) a method to stabilize frequency difference between a transmitter and receiver within close tolerances; 2) the capability to minimize or mitigate frequency chirp or other signal inhibiting noise; and 3) an availability of an "optical mixer" to properly combine the signal and the local amplifying light source or local oscillator (LO). These technologies were not available in the 1990s. A further setback to the adoption and commercialization of an optical coherent system was the introduction of the EDFA, an alternative low cost solution to the sensitivity issue.

Notwithstanding the myriad challenges, an optical coherent system (also referred to as "Coherent Light Wave") remains a holy grail of sorts to the optical community because of its advantages over traditional detection technologies. Coherent Light Wave provides an increase of receiver sensitivity by 15 to 20 dB compared to incoherent systems, therefore, permitting longer transmission distances (up to an additional 100 km near 1.55 µm in fiber). This enhancement is particularly significant for space based laser communications where a fiber-based solution similar to the EDFA is not available. It is compatible with complex modulation formats such as DPSK or DQPSK. Concurrent detection of a light signal's amplitude, phase and polarization allow more detailed information to be conveyed and extracted, thereby increasing tolerance to network impairments, such as chromatic dispersion, and improving system performance. Better rejection of interference from adjacent channels in DWDM systems allows more channels to be packed within the transmission band. Linear transformation of a received optical signal to an electrical signal can then be analyzed using modern DSP technology and it is suitable for secured communications.

There is a growing economic and technical rationale for adoption of a coherent optical system now. Six-port hybrid devices have been used for microwave and millimetre-wave detection systems since the mid-1990s and are a key component for coherent receivers. In principle, the six-port device consists of linear dividers and combiners interconnected in such a way that four different vectorial additions of a reference signal (LO) and the signal to be detected are obtained. The levels of the four output signals are detected by balanced receivers. By applying suitable baseband signal processing algorithms, the amplitude and phase of the unknown signal can be determined.

For optical coherent detection, a six-port 90° optical hybrid should mix the incoming signal with the four quadratural states associated with the reference signal in the complex-field space. The optical hybrid should then deliver the four light signals to two pairs of balanced detectors. Let S(t) and R denote the two inputs to the optical hybrid and $$S(t) + R\exp\left[j\left(\frac{\pi}{2}n\right)\right],$$

with n=0, 1, 2 and 3, represent the four outputs from it Using the PSK modulation and phase-diversity homodyne receiver as an illustration, one can write the following expression for the signal power to be received by the four detectors:

$$P_n(t) \propto P_S + P_R + 2\sqrt{P_S P_R} \cos\left[\theta_S(t) + \theta_C(t) - \frac{\pi}{2}n\right], n = 0, \ldots 3;$$

where $P_S$ and $P_R$ are the signal and reference power, respectively, $\theta_S(t)$ the signal phase modulation, and $\theta_C(t)$ the carrier phase relative to the LO phase. With proper subtractions, the two photocurrents fed to the TIA's can be expressed as $$I_{BD1} \propto \sqrt{P_S P_R} \cos[\theta_S(t) + \theta_C(t)];$$

$$I_{BD2} \propto \sqrt{P_S P_R} \sin[\theta_S(t) + \theta_C(t)];$$

encompassing the amplitude and phase information of the optical signal. Accordingly, the average electrical signal power is amplified by a factor of $4P_R/P_S$. Following this linear transformation the signals are electronically filtered, amplified, digitized and then processed. Compared to a two-port optical hybrid, the additional two outputs have eliminated the intensity fluctuation from the reference source (LO).

An optical coherent receiver requires that the polarization state of the signal and reference beam be the same. This is not a gating item as various schemes or equipment are available to decompose and control the polarization state of the beams before they enter the optical hybrid. Further, certain polarization controllers can be used to provide additional security functionality for optical coherent systems, preventing third parties from tapping information or data streams by implementing polarization scrambling and coding techniques.

For laboratory purposes, a 90° optical hybrid has traditionally been constructed using two 50/50-beam splitters and two beam combiners, plus one 90° phase shifter. These optical hybrids can be implemented using all-fiber or planar waveguide technologies; however, both methods have their respective drawbacks. Both technologies require sophisticated temperature control circuits to sustain precise optical path-length difference in order to maintain an accurate optical phase at the outputs. In addition, fiber-based devices are inherently bulky and are unstable with respect to mechanical shock and vibration; whereas, waveguide-based products suffer from high insertion loss, high polarization dependence and manufacturing yield issues. Waveguide-based products are also not flexible for customization and require substantial capital resources to set up.

Accordingly, a low-cost, temperature insensitive and vibration/shock resistant optical hybrid and method of operating same is desirable and such is provided by the present invention.

SUMMARY OF THE INVENTION

It is an object of the present invention to provide a free-space type interferometer to achieve the hybrid function.

Another object is to provide a low-cost, temperature insensitive and vibration/shock resistant optical hybrid.

These and other objects will be apparent based on the disclosure herein.

An embodiment of the present optical hybrid is based on the Michelson interferometer principle. The Michelson interferometer principle has been proven and tested in free-space bulk-optics and optical component manufacturing. Free-space bulk-optics is a mature technology with a proven track record in providing many critical components, such as circulators, polarization beam combiners, wavelength lockers, dispersion compensators, interleavers and DPSK demodulators, to the fiber-optic communication industry. In addition, bulk-optics based devices have low insertion loss and their core optics can be readily coupled to commercially available fiber collimators.

The fundamental strength of the free-space-interferometer design is that one can make the optical path lengths of the various interference beams in the glass approximately the same such that the phase relationship among the different outputs—a key performance parameter—will not be sensitive to temperature variation, mechanical shock and/or vibration.

Free from any active control, the present optical hybrids are compact (less than 40×40×14 mm), polarization-independent, and thermally stable. The Michelson-interferometer based optical hybrid can also be integrated with a polarization controller, a required component for an optical coherent receiver. By integrating the optical hybrid and polarization controller into one device, a more cost-effective, compact and performance-enhanced component can be manufactured. In contrast, all-fiber or waveguide based devices cannot realize these same benefits because these technologies cannot be similarly combined.

The technological barriers against adopting and commercialising an optical coherent system have been overcome. First, stabilizing the frequency difference between a transmitter and receiver within close tolerances may be accomplished with current advancement in electronics and tunable laser sources. Secondly, system designers have begun introducing the PSK modulation format in network systems, thereby eliminating the frequency chirp associated with OOK. And finally, with the introduction of the present optical hybrids, the final key component for mixing the signal and reference beam in the optical domain has become available.

These advancements in key technological fronts should create sufficient impetus for carriers to re-examine the benefits and economic rationale of an optical coherent system. With the present optical hybrids, the full advantages of a coherent detection scheme may be realized: higher receiver sensitivity, compatibility with PSK modulation, increased tolerance to transmission impairment, more channels within the available bandwidth, and secured communications.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1A:
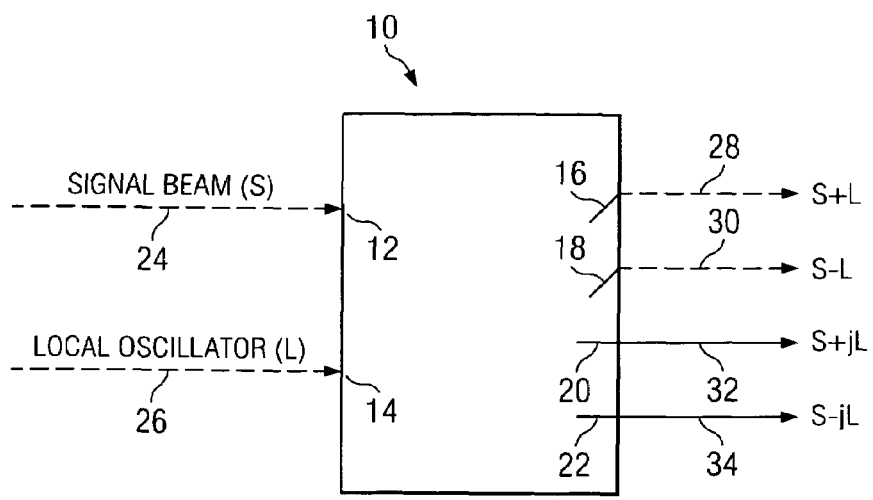
FIG. 1A shows a function diagram for a 90-degree optical hybrid.

FIG. 1A shows a function diagram for a 90-degree optical hybrid 10. This is a Sport device in that it has two input ports 12, 14 and four output ports 16, 18, 20 and 22. As shown in FIG. 1A, a signal light wave 24 is input into input port 12 and a reference light wave 26 (from a local oscillator) is input into input port 14. From the four outputs ports 16, 18, 20 and 22 exits four outputs 28, 30, 32 and 34 respectively which are the interferences between the two input light beams, with various relative phase shift.

Figure 1B:
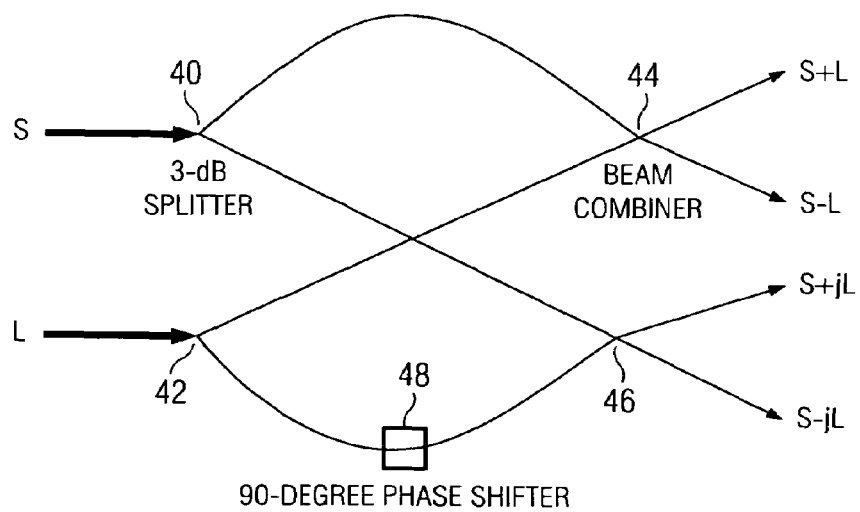
FIG. 1B conceptually illustrates the operation of a 90-degree optical hybrid.

FIG. 1B conceptually illustrates the operation of a 90 degree optical hybrid. It Consists of two 50/50-beam splitters, one each at 40 and 42 and two beam combiners, one each at 44 and 46 plus one 90-degree phase shifter 48. In the practical implementation, this is achieved by waveguide technology. The size is large and it requires temperature control to maintain the required optical path length. In addition to that, typically, the loss is significant and has strong polarization dependence.

Figure 2:
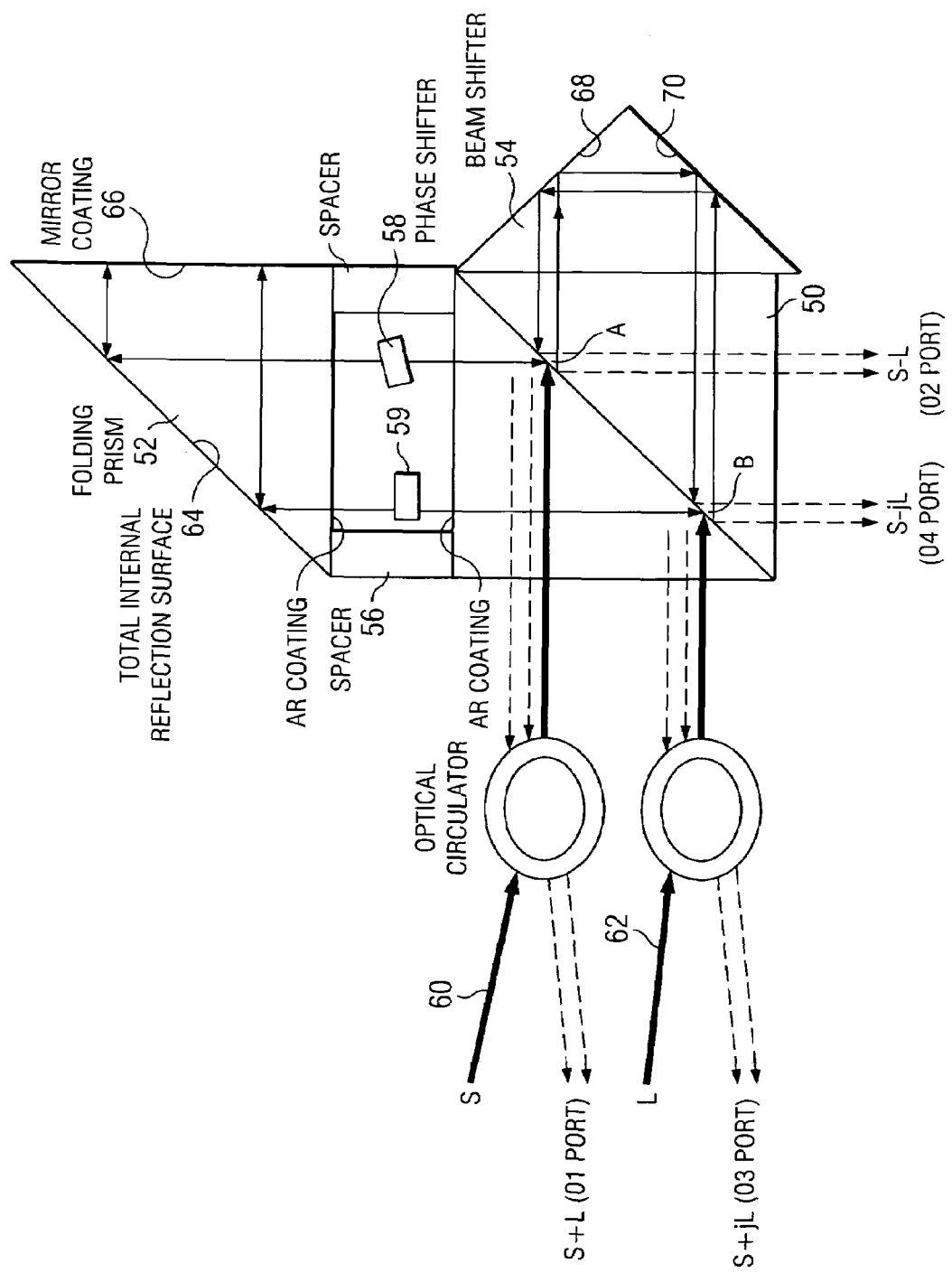
FIG. 2 shows an embodiment of the invention including a 50/50 un-polarized beam splitter, a folding prism, a beam shifter, a spacer and a phase shifter.

FIG. 2 shows an embodiment of the invention. The components are a 50/50 un-polarized beam splitter 50, a folding prism 52, a beam shifter 54, a spacer (or simply a gap) 56 and a phase shifter 58. The gap can include AR coating on its surfaces and/or a wedge to prevent back reflections. The abeam 60 and the L-beam 62 (which traverse optical circulators 61 and 63 respectively) are incident from the left-hand side of beam splitter 50 and hit beam splitter 50 at positions A and B. Both beams split into two parts—a top component and a right component The top reflection optic is folding prism 52, which includes a total-internal reflection oriented surface 64 plus a mirror coating 66. The right reflection optics is beam-shifter 54, which includes two total internal reflection oriented surfaces 68 and 70.

Figure 3:
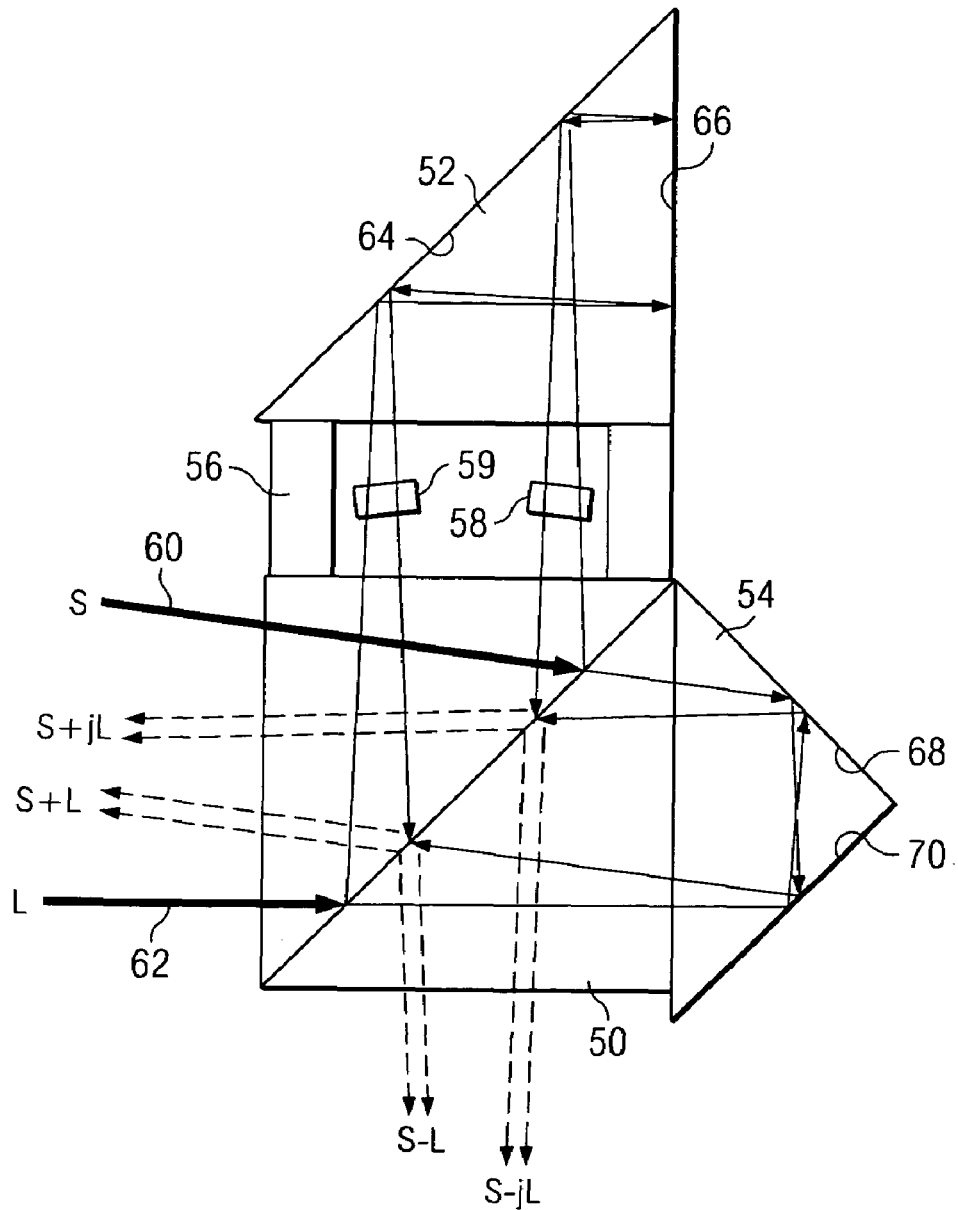
FIG. 3 shows a design that is similar to FIG. 2 without the circulators.

Input beams 60 and 62 traverse the optics and four outputs, S+L, SL, S+jL, S+jL, exit from the beam splitter at output ports 01, 02, 03 and 04 respectively. In the top optical path, there is an air or gas cavity. The index of refraction may be adjusted within this cavity to perform as a phase shifter. In one embodiment, the index of a gas is adjusted. In another embodiment, the cavity contains at least one transparent slab. The illustrated embodiment shows two transparent slabs 58 and 59. The slabs, typically made by glass material, are used as phase shifters. In practical operation, only one slab is needed to perform the phase shifting function, and the other slab is provided to equalize the path lengths. By tuning the angle of the slab (or changing the index of a gas), one can adjust the optical phase of the light beam. FIG 3 shows a similar design, with like components accordingly numbered, but without using the circulators of FIG. 2. In this embodiment, the incident beam has to be tilted slightly.

The phase difference of S and L at the four output ports is phi_0, phi_0+90-degrees, phi_0+180-degree, phi_0+270-degree. In other words, the phase difference between S and L at S+L port can be an arbitrary number phi_0. Once this is determined, the phase difference between S and L at other output ports are 90, 180, 270 shifted from phi_0.

In the embodiments shown in FIGS. 2 and 3, the beam splitter is coated with a non-absorption material. Under such a condition, the relative phase shift between O1 and O3 is 180 degree, as a result of energy conservation. This is the same reason that the relative phase shift between O2 and O4 is 180 degrees. Based on this, all that must be done to set the phase difference between S and L at other output ports to be 90, 180, 270 shifted from phi_0 is to adjust the relative phase shift between O1 and O2 such that it meets the requirement of 90 degrees.

In both the top and right optical paths of FIGS. 2 and 3, the light beam is totally internally reflected twice before interference occurs. This will make the phase difference of the interference beams to be independent of the polarization. It has assumed that the beam splitter itself does not introduce any polarization dependent phase. This can be implemented by coating the beam splitter symmetrically. (See U.S. Pat. No. 6,587,204, incorporated herein by reference). In this design, the reflection optics on the top path is a folding prism, acting as a mirror, and that of the right path is a beam shifter. This is the trick used here to bring together the two spatially separated incident beams, S and L. If the polarization effect is not important, the top folding prism can be replaced by a flat mirror. Ideally, one phase shifter should be enough to adjust the phase. The second one is mainly to provide optical path symmetry. It makes the path of both beams on the top optical path to be symmetrical. As discussed below, to make the optical paths of the top and right more symmetrical, one can add a cavity between the beam splitter and the beam-shifter.

Figure 4:
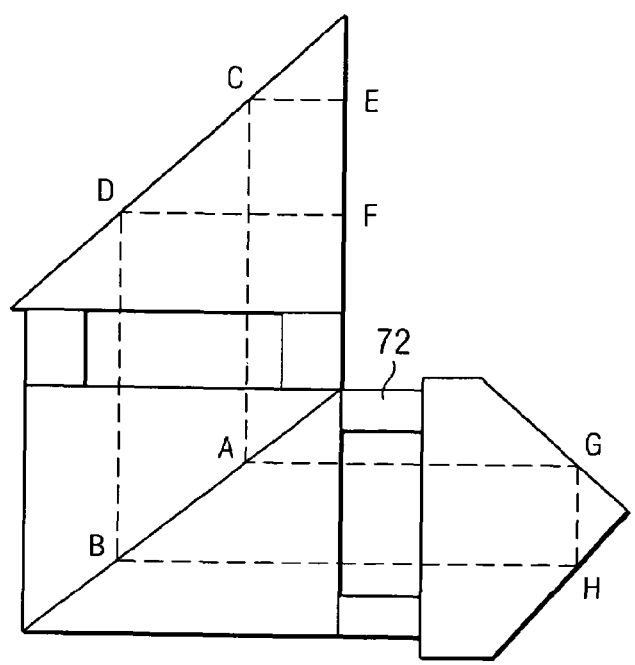
FIG. 4 illustrates a design having symmetrical cavities in the top and right arms.

FIG. 4 illustrates a design having symmetric cavities in the top and right arms. A fine phase adjustment is finally achieved by inserting a thin glass slab as discussed above to provide angular tuning. In this design, the phase matching condition is attainable (±¼ wavelength) when X1−Y1=X2−Y2, where the optical paths are ACE=X1, BDF=X2, AGHB=Y1 and BHGA=Y2. The cavity in the right arm is provided by inserting spacer 72. Note also that with the use of the air cavity in both the top and right arm, it is easier to make the device stable over different temperatures.

Figure 5:
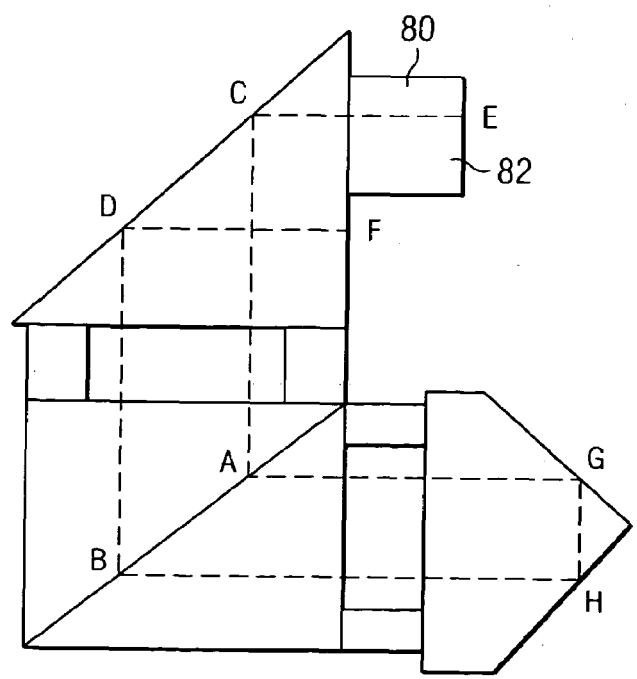
FIG. 5 shows a design similar to that of FIG. 4, except that the path length ACE is lengthened.

The design in FIG. 5 is similar to the design of FIG. 4, except that the path length ACE is lengthened with the addition of optical element 80, which is a piece of material having an appropriate index of refraction to the wavelength of use and further includes a reflective surface 82. Thus, ACE~BDF. Here, the phase match condition is achieved when X1~X2~Y1=Y2, and X1−Y1=X2−Y2 (±¼ wavelength) wherein ACE=X1, BDF=X2, AGHB=Y1 and BHGA=Y2.

Figure 6A:
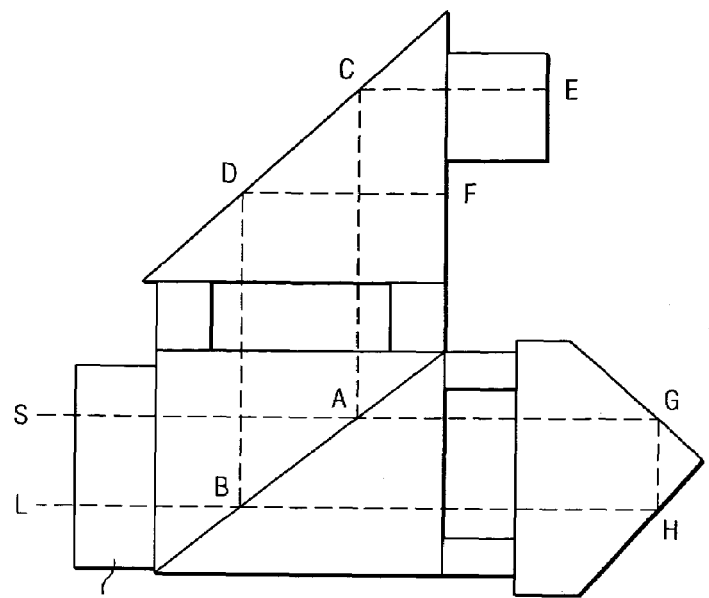
FIG. 6A is a top view of a design integrated with a polarization beam splitter to provide a polarization diversity coherent detection system.
Figure 6B:
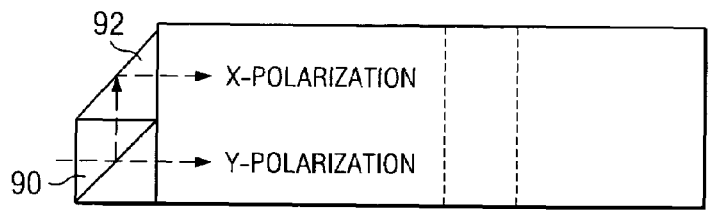
FIG. 6B is a side view of the design of FIG. 6A.

FIG. 6A shows a top view and 6B shows a side view of a design integrated with a polarization beam splitter 90 (not visible in FIG. 6A) and reflecting prism 92 to provide a polarization diversity coherent detection system. The PBS on the left side of the beam splitter separates the two orthogonal polarizations X and Y of S and L into $S_x$, $S_y$, $L_x$ and $L_y$.

Figure 7:
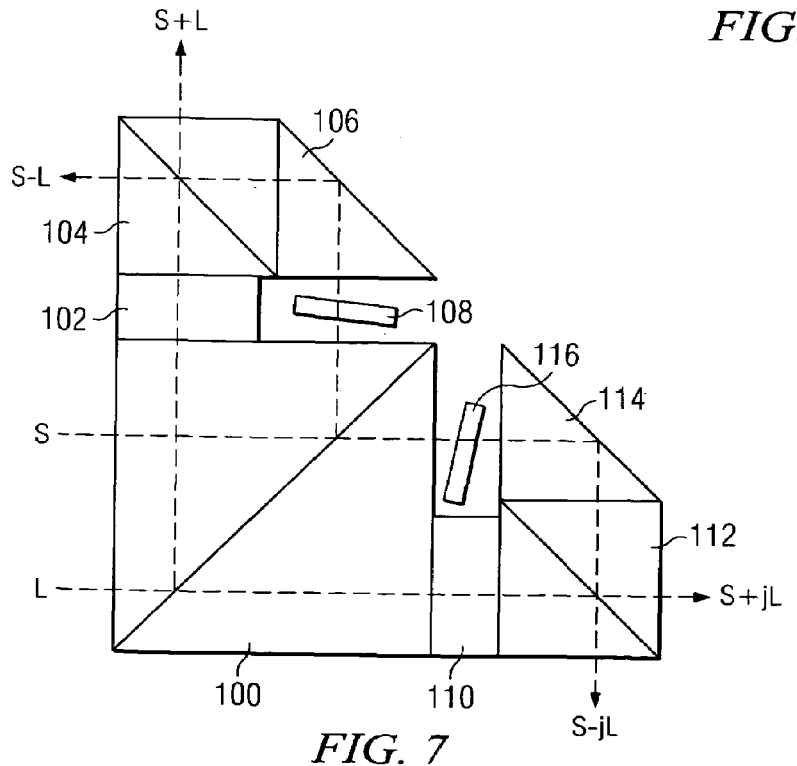
FIG. 7 shows a 2×4 optical hybrid implemented by 3 independent beam splitters.

FIG. 7 shows a 2×4 optical hybrid implemented by 3 independent beam splitters. The 2 inputs are S (signal) and L (local oscillator). The 4 outputs are S+L, S+jL, S−L, S−jL. The device includes an unpolarized beam splitter (UPB) 100. The upper and right arms are approximately symmetrical. The upper arm includes an optical element 102 connected on one of its sides to the upper face of UPB 100 and connected on the other side to an UPB 104. A folding prism 106 is connected to the right face of UPB 104. In this embodiment, a slab 108 of optically transmissive material is located in a space between the folding prism 106 and the UPB 100. The right arm is symmetrical with the upper arm. The right arm includes an optical element 110 connected on one of its sides to the right face of UPB 100 and connected on the other side to an UPB 112. A folding prism 114 is connected to the upper face of UPB 112. In this embodiment, a slab 116 of optically transmissive material is located in a space between the folding prism 114 and the UPB 100. In operation, to produce the desired relative phase between the S and L beams at each output port, the slab 108 is adjusted; however, as discussed in the embodiments of FIGS. 2 and 3, a cavity can be formed by enclosing the space between the UPB 100 and the folding prisms 106 and/or 114 and the index of refraction of a gas can be altered to adjust the phase.

Figure 8A:
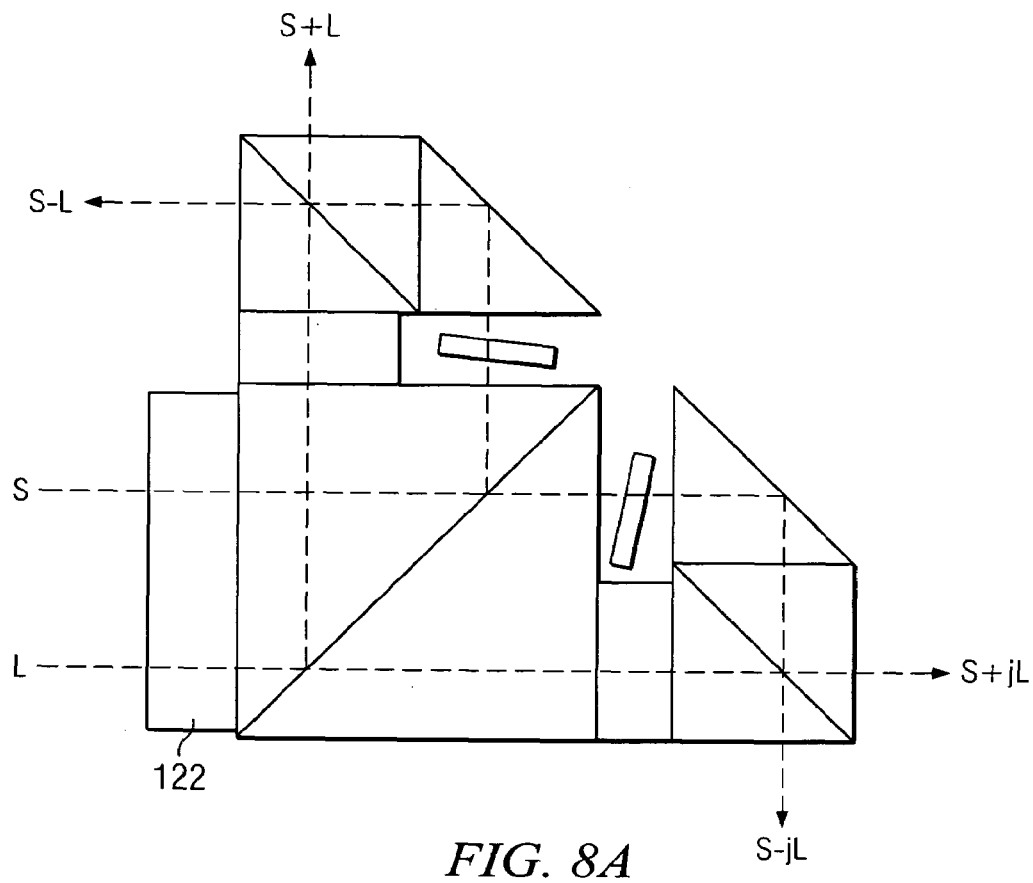
FIGS. 8A and 8B are a top view and a side view, respectively, of a 2×8 optical hybrid that includes a PBS and a folding prism.
Figure 8B:
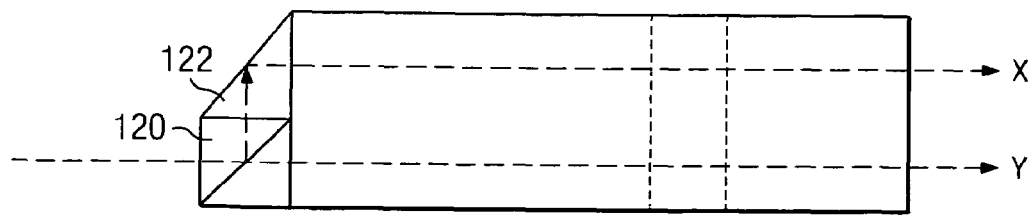

FIG. 8A is a top view and 8B is a side-view a 2×8 optical hybrid that integrates a PBS 120 (not visible in FIG. 8A) and folding prism 122 into the module. The 2 inputs are S and L and the 8 outputs are Sx+Lx, Sx+jLx, Sx−Lx, Sx−jLx, Sy+Ly, Sy+jLy, Sy−Ly, Sy−jLy. With this arrangement, the splitting ratio of the beam splitter can be different from the beam combiners. This provides the freedom to adjust the relative amplitudes at the output ports. Dual fiber collimators are not required.

REFERENCES

G. P. Agrawal, "Fiber-Optic Communication Systems", $2^{nd}$ Ed., John Wiley & Sons, Inc., New York, 1997.

R. Noe, in Proc. *Opto-Electronics and Communications Conf.*, Yokohama, Japan, Jul. 12-16, 2004, pp. 818-819.

G. Goldfarb, C. Kim and G Li, *IEEE Photonics Technology Letters*, Vol. 18, 517-519 (2006).

D.-S. Ly-Gagnon, S. Tsukamoto, K. Katoh and K. Kikuchi, *J. of Lightwave Tech.*, Vol. 24, 12-21 (2006).

L. G. Kazovsky, L. Curtis, W. C. Young and N. K. Cheung, *Applied Optics*, Vol. 26, 437-439 (1987).

S. Camatel, V. Ferrero and P. Poggiolini, "2-PSK Homodyne Receiver Based on a Decision Driven Architecture and a Sub-Carrier Optical PLL," in *Proc. Optical Fiber Communications Conference*, Anaheim Calif., Mar. 5-10, 2006, Paper No. OTuI3.

S. Camatel and V. Ferrero, *IEEE Photonics Technology Letters*, Vol. 18, 142-144 (2006).

J. Li, R. G. Bosisio and K. Wu, *IEEE Trans. Microwave Theory Tech.*, Vol. 43, 2766-2772 (1995).

T. Visan, J. Beauvais and R. G. Bosisio, *Microwave and Optical Technology Letters*, Vol. 27, 432-438 (2000).

C. Dorrer, D. C. Kilper, H. R. Stuart, G. Raybon and M. G. Raymer, *IEEE Photonics Technology Letters*, Vol. 15, 1746-1748 (2003).

D. Yu, "Optical Hybrid Enables Next Generation Optical Communication", *Wikipedia*, 2006

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An optical hybrid, comprising: means for splitting a signal light beam (S) into a reflected signal light beam (RS) and a transmitted signal light beam (TS); means for splitting a reference light beam (L) into a reflected light beam (RL) and a transmitted light beam (TL); and means for combining pairs of said RS, TS, RL and TL to produce a plurality of combined output beams comprising an S+L beam, an S+jL beam, an S−L beam and an S jL beam, wherein the phase difference between said S light beam and said L light beam in said S+jL beam, said S−L beam and said S−jL beam, with respect to the phase difference between said S light beam and said L light beam in said S+L beam, is about 90 degrees, 180 degrees and 270 degrees, respectively; and wherein said means for splitting a signal light beam and said means for splitting a reference light beam together comprise a first beam splitter comprising a first face, a second face, a third face, a fourth face and an internal reflecting/transmitting coating.

2. The optical hybrid of claim 1, wherein said means for combining comprises: a reflecting surface fixedly separated by a gap from said second face; means for adjusting the index of refraction N within said gap; and a beam shifter fixedly connected to said third face.

3. The optical hybrid of claim 1, wherein said beam splitter is selected from a group consisting of an unpolarized beam splitter and a beam splitter designed for only one polarization.

4. The optical hybrid of claim 3, wherein said unpolarized beam splitter comprises a cube.

5. The optical hybrid of claim 2, wherein said means for adjusting the index of refraction N comprises means for adjusting the index of refraction of a gas within said gap.

6. The optical hybrid of claim 2, wherein said means for adjusting the index of refraction N comprises at least one optical flat positioned within said gap.

7. The optical hybrid of claim 1, further comprising a first optical circulator positioned to receive and operatively align said S beam into said first face, wherein said S+L team will exit said first optical circulator, said optical hybrid further comprising a second optical circulator positioned to receive and operatively align said L beam into said first face, wherein said S+jL beam will exit said second optical circulator.

8. The optical hybrid of claim 2, further comprising a second spacer fixedly attached to said third face, wherein said beam shifter is fixedly connected by said second spacer to said third face.

9. The optical hybrid of claim 8, wherein said third face, said spacer and said beam shifter form a second gap.

10. The optical hybrid of claim 9, further comprising means for adjusting the optical path length through said second gap.

11. The optical hybrid of claim 10, wherein said means for adjusting the index of refraction N comprises means for adjusting the index of refraction of a gas within said second gap.

12. The optical hybrid of claim 10, wherein said means for adjusting the index of refraction N comprises at least one second optical flat positioned within said second gap.

13. The optical hybrid of claim 8, further comprising an optical path addition fixedly attached to said folding prism.

14. The optical hybrid of claim 1, further comprising means for separating the polarizations of said S beam and said L beam prior to their being operatively aligned into said first face.

15. The optical hybrid of claim 14, wherein said means for separating the polarizations comprises a polarizing beam splitter (PBS) configured to transmit one polarization component (Y) into said first face and reflect an orthogonal polarization component (X), said means further comprising a folding prism operatively attached to said PBS to reflect X into said first face in a spatially separate parallel plane.

16. The optical hybrid of claim 2, wherein said reflection surface is part at a folding prism.

17. The optical hybrid of claim 1, wherein said means for combining comprises: a first optically transmitting element fixedly attached to said second face; a second beam splitter fixedly attached to said first optically transmitting element; a first folding prism attached to said second beam splitter; a first gap between said first beam splitter and said first folding prism; a second optically transmitting element fixedly attached to said third face; a second beam splitter fixedly attached to said second optically transmitting element; a second folding prism attached to said second beam splitter; a second gap between said first beam splitter and said second folding prism.

18. The optical hybrid of claim 17, wherein at least one of said first beam splitter, said second beam splitter or said third beam splitter is selected from a group consisting of an unpolarized beam splitter and a beam splitter designed for only one polarization.

19. The optical hybrid of claim 18, wherein said unpolarized beam splitter comprises a cube.

20. The optical hybrid of claim 9, wherein said means for adjusting the optical path length comprises means for adjusting the index of retraction of a gas within at least one of said first cavity or said second cavity.

21. The optical hybrid of claim 17, wherein said means for adjusting the index of refraction N comprises at least one optical flat positioned within at least one of said first gap or said second gap.

22. The optical hybrid of claim 17, further comprising means for separating the polarizations of said S beam and said L beam prior to their being operatively aligned into said first face.

23. The optical hybrid of claim 22, wherein said means for separating the polarizations comprises a polarizing beam splitter (PBS) configured to transmit one polarization component (Y) into said first face and reflect an orthogonal polarization component (X), said means further comprising a folding prism operatively attached to said PBS to reflect X into said first face in a spatially separate parallel plane.

24. A method, comprising: splitting a signal light beam (S) into a reflected signal light beam (RS) and a transmitted signal light beam (TS); splitting a reference light beam (L) into a reflected light beam (RL) and a transmitted light beam (TL); and combining pairs of said RS TS, RL and TL to produce a plurality of combined output beams comprising an S+L beam, an S+jL beam, an S−L beam and an S−jL beam, wherein the phase difference, between said S light beam and said L light beam in said S+jL bean, said S−L beam and said S−jL beam, with respect to the phase difference between said S light beam and said L light beam in said S+L beam, is about 90 degrees, 180 degrees and 270 degrees respectively; wherein said steps of splitting the signal light beam S and splitting the reference light beam L are carried out with a beam splitter comprising a first face, a second face, a third face, a fourth face and an internal reflecting/transmitting coating; the method further comprising the step of separating the polarizations of said S beam and said L beam prior to their being operatively aligned into said first face.

* * * * *

UNITED STATES PATENT AND TRADEMARK OFFICE
CERTIFICATE OF CORRECTION

PATENT NO. : 7,573,641 B2
APPLICATION NO. : 11/729004
DATED : August 11, 2009
INVENTOR(S) : Yung-Chieh Hsieh It is certified that error appears in the above-identified patent and that said Letters Patent is hereby corrected as shown below:

Column 8, in Claim 1, line 6, replace "S jL" with --S-jL--;

Column 8, in Claim 7, line 34, replace "team" with --beam--;

Column 9, in Claim 20, line 24, replace "claim 9" with --claim 17--; and

Column 9, in Claim 20, line 26, replace "retraction" with --refraction--.

Signed and Sealed this

Ninth Day of February, 2010

David J. Kappos
*Director of the United States Patent and Trademark Office*